Dec. 6, 1960  F. K. MUELLER  2,963,242
GYROSCOPIC INERTIAL GUIDANCE MECHANISM FOR SPACE VEHICLES
Filed Feb. 18, 1959  5 Sheets-Sheet 1

FRITZ K. MUELLER,
INVENTOR.

BY S. J. Rotondi,
A. T. Dupont, and
Alvin E. Moore,
ATTORNEYS.

Dec. 6, 1960 F. K. MUELLER 2,963,242
GYROSCOPIC INERTIAL GUIDANCE MECHANISM FOR SPACE VEHICLES
Filed Feb. 18, 1959 5 Sheets-Sheet 4

FRITZ K. MUELLER,
INVENTOR.

BY S. J. Rotondi,
A. T. Dupont, and
Alvin E. Moore,
ATTORNEYS.

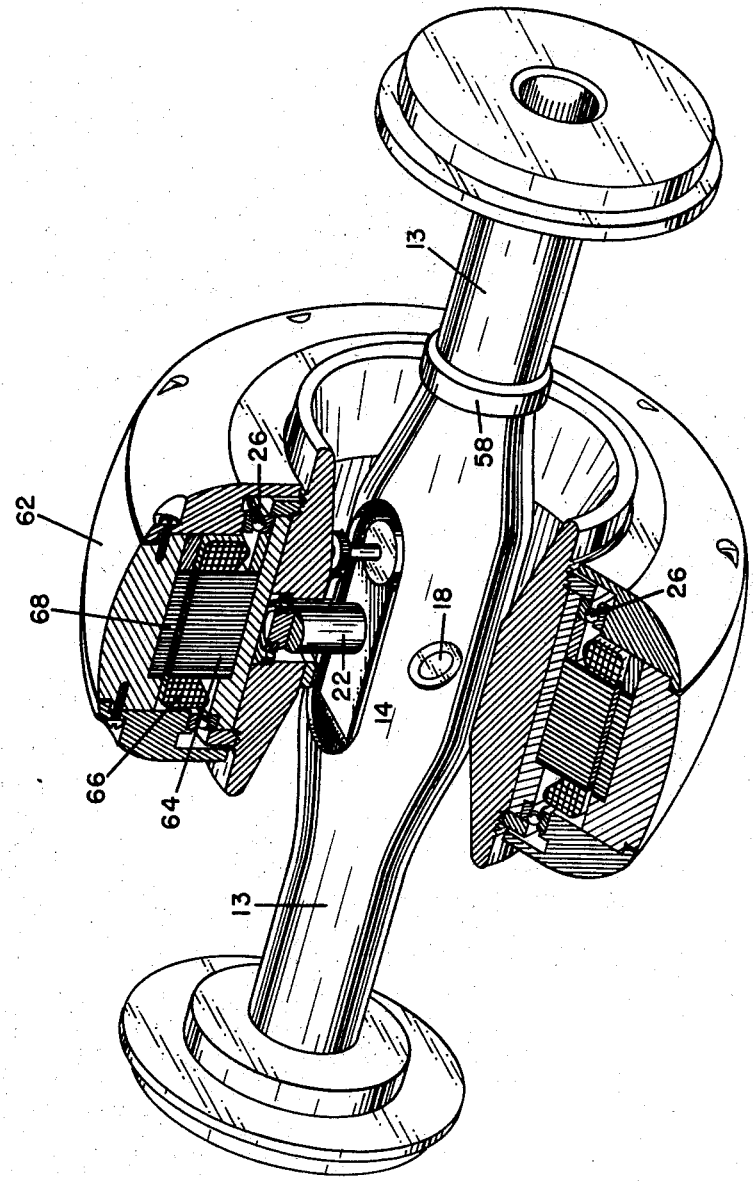

United States Patent Office 2,963,242
Patented Dec. 6, 1960

2,963,242

GYROSCOPIC INERTIAL GUIDANCE MECHANISM FOR SPACE VEHICLES

Fritz K. Mueller, Huntsville, Ala., assignor to the United States of America as represented by the Secretary of the Army Filed Feb. 18, 1959, Ser. No. 794,212

12 Claims. (Cl. 244—14)

(Granted under Title 35, U.S. Code (1952), sec. 266)

The invention described herein may be manufactured and used by or for the Government for governmental purposes without the payment of any royalty thereon.

This invention relates to a gyroscopic inertial guidance mechanism for space vehicles. Such a mechanism comprises a platform that is mounted on the missile or other craft, is stabilized relative to space and the stars, and thus establishes a space-fixed, missile-guidance system of three reference coordinates.

Departure of the vehicle from its desired relationships to each of these coordinates or axes is indicated by an accelerometer which measures the accelerations involved in the departure and transmits a signal voltage to an integrator. In the integrator the voltages caused by departures or deviational components relative to the three reference axes are integrated by mechanical and/or electrical means; and from the integrator two voltages, representing missile velocity and missile distance along the line of departure relative to one of the axes, are supplied to a guidance and control computer.

The conventional gyroscopically nad spatially stabilized element, such as a platform of the general type referred to above, or such as a spinning gyroscope, comprises two or three gimbal rings that are external to the spinning and stabilizing mass or masses. Such exterior pivoting entails the problem of bulk and weight and the problem of accuracy-disturbing lack of isoelasticity of the varyingly sized, relatively large parts. When this gyroscopic mechanism is used in missiles, satellites or other space vehicles that are ubject at times to very high accelerations and vibrations these problem become an especial hindrance to efficiency.

In view of the above facts, an object of this invention is to provide a gyroscopically stabilized inertial guidance mechanism or other gyroscopically stabilized element having gimbals that are located interiorly of the stabilized element.

Another object of the invention is to provide a gyroscopically stabilized platform or other element that has light-weight, strong, internally mounted gimbals that have a high degree of rigidity and isoelasticity, and therefore reduce to a minimum the disturbing torques and inaccuracies due to unequal elastic deformations for different directions of acceleration.

The foregoing and other objects will become more fully apparent from the following detailed description of exemplary structure embodying the invention and from the accompanying drawings in which:

Figure 7 is a perspective view, partly in section, of another form of the invention, shown as embodied in a gyroscope.

Figure 1:
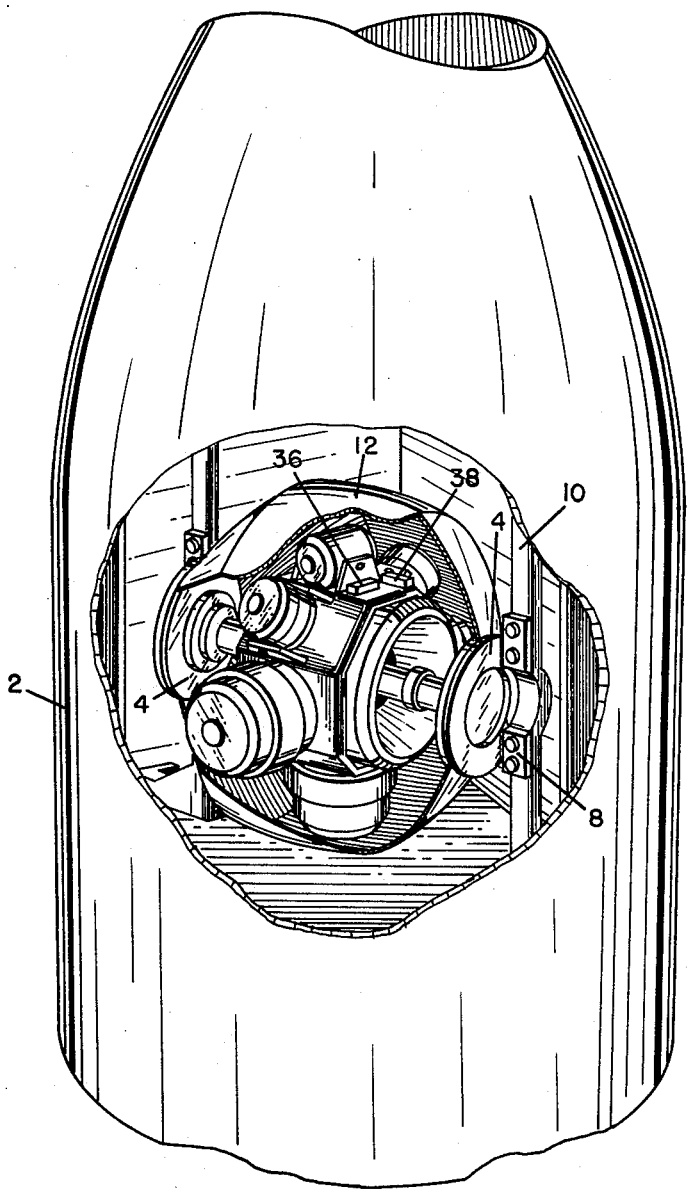
Figure 1 is a perspective view of a ballistic missile or other space vehicle, with part of its hull broken away to show the inertial guidance mechanism and its mounting.

As shown in the drawings, the invention comprises: a missile or other space vehicle having a hull 2; gyroscope supporting means 4, attached to the missile hull; and, in Figures 1 to 6, an inertial guidance platform 6, comprising gyroscopes, a stabilized instrument support, and accelerometers.

In the form of the invention shown in Figures 1, 2, 4 and 5, the spaced side supports 4 are adapted to be fixed to vehicle hull 2 by means of brackets 8 and longitudinal support 10. Brackets 8 are fixed, as by welding, to side supporting means 4; and, in this form, side elements 4 support and are sealingly secured to casing 12, which encloses the stabilized platform and its instruments. Side elements 4 also are fixed to and support a pair of hollow shafts 13, that are fixedly joined by yoke 14.

By means of gimbals, yoke 14 universally mounts instrument support 16, so that the support has three degrees of freedom relative to three pairs of pivots. One pair of these pivots comprises pins 18, having axes that coincide with yaw axis Y of the stabilized platform. These pins, only one of which is visible in Figure 2, may be journalled in yoke 14 and fixed to member 20, or vice versa. Member 20 has trunnions 22, on which gimbal ring 24 is mounted for pivotal movement about roll axis R. By means of bearings 26 (which may be air bearings in lieu of the illustrated antifriction bearings), outer gimbal ring 28 is journalled on ring 24. This outer ring forms a part, or is fixed to, instrument support 16.

Figure 2:
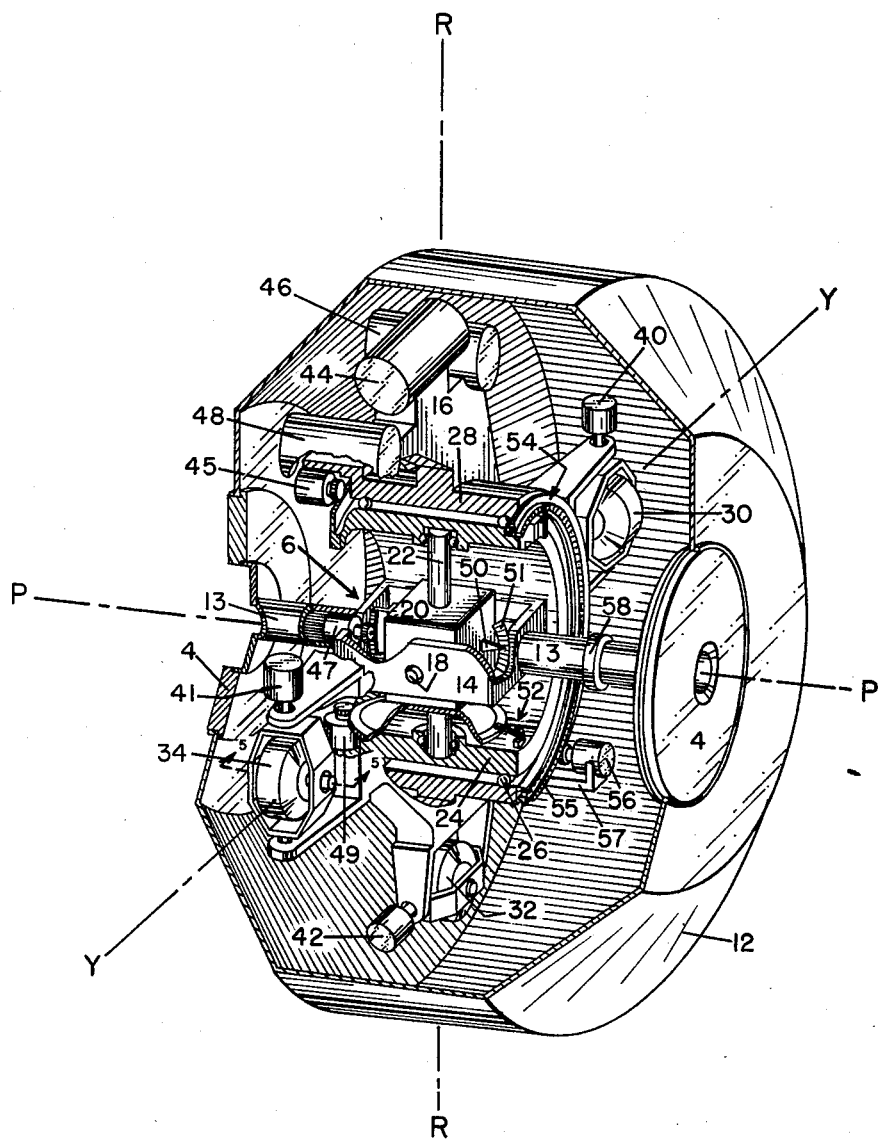
Figure 2 is a perspective view of one form of the inertial guidance mechanism, with part of the outer casing broken away and parts of the inner structure shown in section, for indication of the inner details.

Support 16 thus is mounted on hull 2 with three degrees of freedom. It is stabilized in space on the pitch, roll and yaw axes, by means of pitch, roll and yaw gyroscopes 30, 32 and 34. As indicated in Figures 1 and 2, these gyroscopes are mounted, in circumferentially arranged relation by means of brackets or welding, on annular support 16—28. Ring 16—28 also supports various measuring instruments, of known types, by means of which deviations of the space vehicle from a predetermined position relative to the stabilized platform may be ascertained.

In Figure 1, two of these instruments are shown at 36 and 38. These are known level-indicating instruments which function while the missile is in launching position to send signals (based on electric current received from the ground via a missile tail plug) to gyroscope torquers 40 and 41 when the stabilized platform deviates from its desired position relative to the plane of the horizon. Since the missile in its launching position has its roll axis R—R in a substantially vertical position torquer 40, by causing precession of pitch gyroscope 30, and torquer 41, by causing precession of yaw gyroscope 34, thus maintain the axes of level-sensing instruments 36 and 38 in a horizontal position. During launching the tail plug is pulled out and the torquers are no longer energized from the ground. For a relatively short flight the stabilizing gyroscopes may be unsupervised, but for a long flight, such as that of a satellite or moon-exploration vehicle, star or horizon sensing means for supervising the gyroscopes, by energizing torquers 40, 41 and 42 in a known manner, may be utilized.

In either event, those inaccuracies of the gyroscopes that are due to the friction of their bearings preferably are compensated for by means of electric servo motors 45, 47 and 49. Motor 45 is mounted on instrument-support 16—28 and is drivingly connected with inner ring 24, for compensating for the friction of bearings 26. Motor 47 is mounted within one of hollow shafts 13, and compensates for the friction of the bearings of trunnions 18. Motor 49 is mounted on inner gimbal ring 24, and compensates for the friction of the bearings of trunnions 22.

During flight, instrument support 16 and accelerometers 44, 46 and 48 are so aligned relative to a plane parallel to the horizon that they measure components (along predetermined lines) of accelerations of the missile that cause it to depart from its calculated course and speed. These accelerometers supply sginal voltages thru one of hollow shafts 13 to a guidance and control computer.

Also supplied to the computer, in a known manner, are signal voltages from three pickups 50—51, 52 and 54, which are of a known type, and which indicate departures of shafts 13 (and of the attached vehicle) from their desired attitude relative to platform 28—16. Pickup or potentiometer 50—51, which comprises a wire-wound or other resistance 51, measures deviations of the missile in attitude about the yaw axis Y—Y. When resistance element 51, which is fixed relative to the yaw axis, moves relative to element 50 a signal voltage is transmitted to the computer, and thence to an attitude-controlling mechanism. In like manner, pickups 52 and 54 supply signals when the missile departs in attitude relative to the roll and pitch axes, R—R and P—P. In connection with pickup 54, and with reference to Figures 2 and 4, it is pointed out that ring 55 is mounted on outer gimbal ring 28 by means of bearings, and has fixed thereto resistance ring or segment 55A. The angular position of ring 55 relative to ring 28, about the axis P, is determined by means of step motor 56 (which, alternatively, may be a continuous motor) which is mounted on ring 28 by means of bracket 57. This motor is a pitch-programming device, receiving signal current from the programming tape recorder, which is prepared before flight. Pickup 54 measures displacement between inner ring 24 and ring 55—55A.

Figure 3:
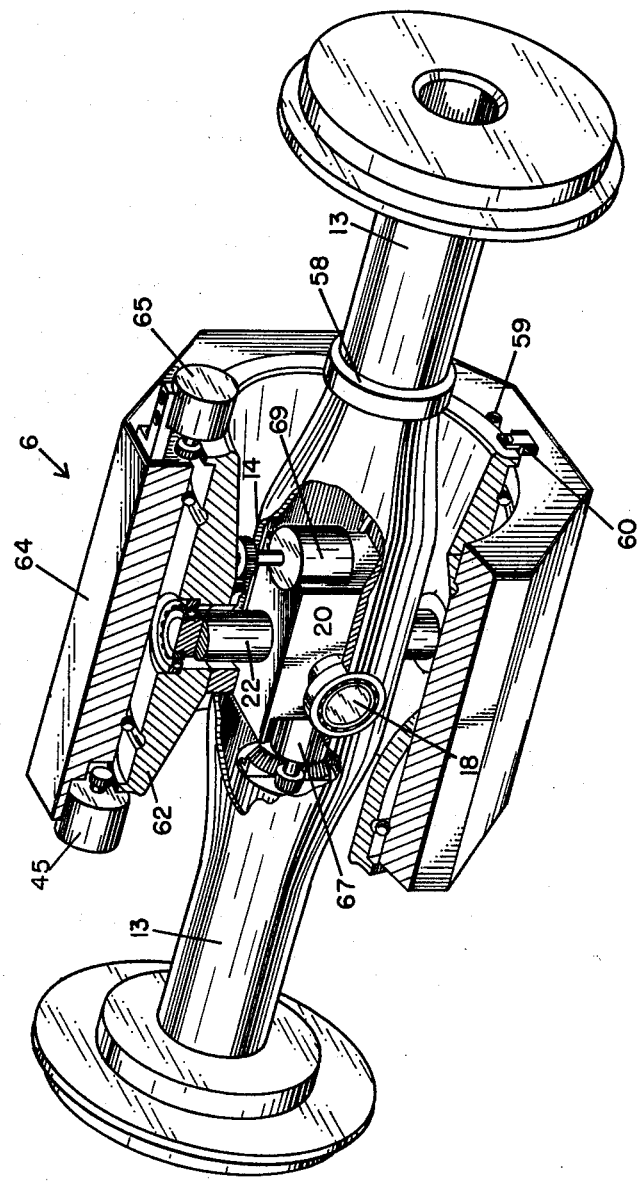
Figure 3 is a perspective view, partly in section, of another form of the inertial guidance mecahnism.
Figure 4:
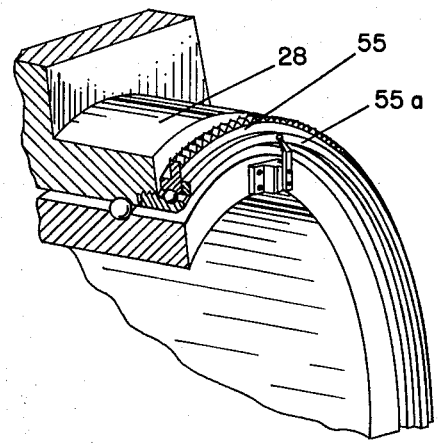
Figure 4 is a sectional, detail view.
Figure 5:
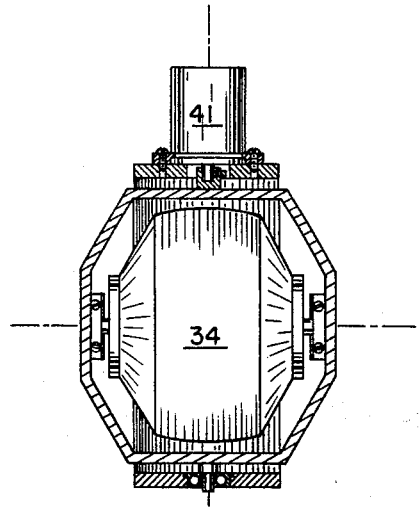
Figure 5 is a detail view in section thru one of the stabilizing gyroscopes, along the plane indicated by line 5—5 of Figure 2.
Figure 6:
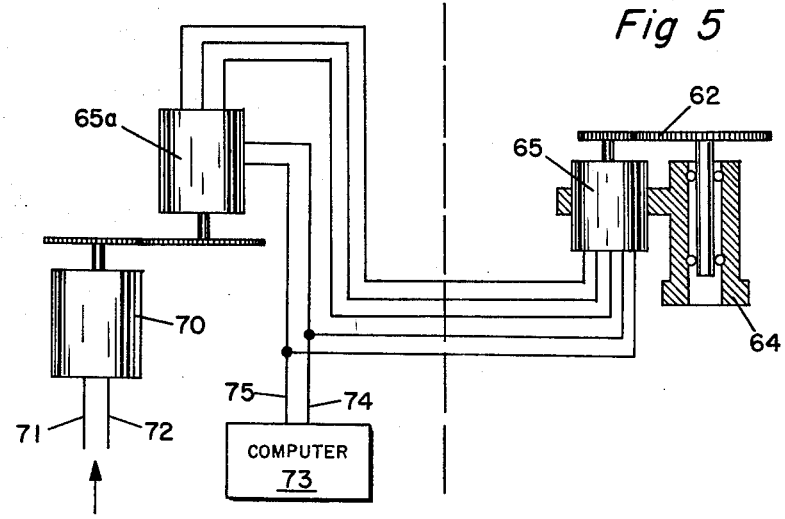
Figure 6 is a schematic view of the pitch-control selsyn device and computer which are utilized with the form of Figure 3.

To prevent damage to the device when the gyroscope motors are not energized, a rubber bumper or stop, 58, is provided. In the form of Figure 3 elements 59 and 60 also serve as stops, which limit the relative movement of inner and outer gimbal rings 62 and 64 by contact of pins 59 and rubber abutment 60.

In this modification shafts 13 and yoke 14 are integral and may be formed from a single tube; and no housing, similar to casing 12 of Figure 2, is provided. This form also differs from that of Figure 2 in that no separate end ring, such as ring 55 of Figure 2, and no pitch potentiometer, such as 54, are used. Instead, synchro-transformer or selsyn device 65 is geared directly to inner gimbal ring 62, shown schematically in Figure 6. Synchro-transformer 65 is electrically connected with like selsyn device 65A (which is outside the platform and is driven by program-input motor 70). At times, dictated by the predetermined conditions of flight, motor 70 receives signal current from the programming tape recorder, via conductors 71 and 72.

Rotors 65 and 65A have stators that are electrically connected, via conductors 74 and 75, to missile pitch control computer 73, so that any displacement of rotor 65 and/or rotor 65A causes a voltage input into the computer. This voltage may be due either to unpredicted departure of the missile from its desired attitude about the pitch axis, picked up by selsyn device 65, or may be due to the predetermined pitch programming provided for by the tape recorder, picked up by selsyn device 65A.

In the form of the invention shown in Figure 7, a single gyroscope is mounted on internal gimbals, comprising bearing elements 18, 22 and 26. Gyroscopic disc 62 is driven by an induction motor which comprises stator core laminations 64, stator windings 66 and rotor laminations 68.

Within the scope of the subjoined claims, the invention comprehends various obvious changes in the specific structure that is herein illustrated.

The following invention is claimed:

1. A stabilized inertial guidance device, adapted for use in the guidance of a vehcile, comprising: instrument-supporting means having a cylindrical internal surface and having roll, pitch and yaw axes; a gimbal ring having an outer cylindrical surface that is journalled within said internal surface, a pair of side supporting elements adapted to be fixed to a vehicle; a transverse supporting element fixed to said side supporting elements and having a middle portion located within said gimbal ring and containing one of said axes; two gimbal elements between said middle portion and said gimbal ring, said two gimbal elements and gimbal ring constituting three internal gimbal elements, within said means, supporting said means from said vehicle entirely via said internal surface and mounting said means for three degrees of freedom in space; three gyroscopes, stabilizing said means about each of said axes; and gyroscopic, force measuring and signalling instruments mounted on said means.

2. A device a set forth in claim 1, which further comprises a potentiometer having one part mounted on said middle portion and another part mounted on one of said gimbal elements, said potentiometer adapted to transmit a voltage signalling relative movement between said portion and said one of said gimbal elements, about one of said axes; and two other potentiometers having relatively movable parts on the other two of said gimbal elements, adapted to transmit voltages signalling relative movement between said middle portion and said means about the other two of said three axes.

3. A gyroscopic device comprising: a ballistic missile, having a hull; aligned support members fixed to said hull; a casing sealingly secured to said aligned members and housing a pair of spaced ends of said aligned members; a yoke fixed to and joining together said pair of spaced ends; a gimbal assembly comprising a first pair of coaxial trunnions that are pivotally supported by said yoke and a second pair of coaxial trunnions that have a common axis that is normal to said first pair of trunnions; bearings between said yoke and first pair of trunnions; an inner gimbal ring, surrounding said second pair of trunnions; a bearing between said inner gimbal ring and each of said second pair of trunnions; an outer gimbal ring, encircling said inner ring; a bearing between said gimbal rings; three gyroscopes supported by said outer ring, one gyroscope stabilizing said outer ring about each of three axes, two of said three axes coinciding with the perpendicular axes of said two pairs of aligned trunnions and the third of said axes coinciding with the axis of said outer gimbal ring; and accelerometers and level sensing instruments supported by said outer ring.

4. A gyroscopic device comprising: a supporting member subject to change of position in space; a support element having its ends fixed to said member and a middle portion having an aperture extending thru said element; two perpendicular pairs of aligned trunnions, having axes that intersect at right angles within said aperture; bearings journalling one of said pairs of trunnions with respect to said support element; a gimbal ring, surrounding said pairs of trunnions and having an axis that is perpendicular to each of said intersecting axes; a bearing between said gimbal ring and each of said other pair of trunnions; an outer gimbal means having an inner cylindrical surface that encircles and is coaxial with said gimbal ring; a bearing between said gimbal ring and outer gimbal means; and a gyroscopic element supported by said outer gimbal means.

5. A gyroscopic device as set forth in claim 4, in which said supporting member is a ballistic missile, said outer gimbal means comprises a space-stabilized, inertial guidance platform having pitch, roll and yaw coordinate axes that coincide with said three perpendicular axes, and in which said gyroscopic element is a gyroscope, constructed and arranged to stabilize said platform about one of said three coordinate axes, said gyroscopic device further comprising two additional gyroscopes, supported by said gimbal means and constructed and arranged, respectively, to stabilize said platform about the other two of said coordinate axes.

6. A device as set forth in claim 5, which further comprises a torque-generating device connected to each of said gyroscopes, adapted to receive and be energized by signals, constructed and arranged to apply a torque on its associated gyroscope, thereby causing said gyroscope to precess about one of said pitch, roll and yaw coordinate axes.

7. A device as set forth in claim 6, which further comprises: a ring adjacent to and coaxial with said inner cylindrical surface; a bearing supporting said last-named ring on said outer gimbal means; a wire-wound potentiometer resistance supported by said last-named ring; a potentiometer arm supported by said inner gimbal ring and coacting with said resistance for transmitting a signal of relative movement between said rings; and a motor mounted on said inertial guidance platform, adapted to receive and be energized in response to a pitch-programming signal from without said gyroscopic device, and means drivingly connecting said motor to said ring that is adjacent to said inner cylindrical surface.

8. A device as set forth in claim 5, which further comprises a casing, secured to the ends of said support element and housing said platform, gimbal ring, gimbal element, bearings and gyroscopes.

9. A device as set forth in claim 4, in which the ends of said support element comprise hollow shafts, and which further comprises a power-transmission element fixed to said trunnions, a servo motor housed within and having its stator fixed to one of said hollow shafts, a second power-transmission element connected to said motor and in engagement with said first-named power transmission element, said motor and power-transmission elements being constructed and arranged to exert a friction-compensating torque on said trunnions; a second friction-compensating servo motor mounted on said outer gimbal element and drivingly connected with said inner gimbal ring; and a third friction-compensating servo motor constructed and arranged to exert a torque between said inner gimbal ring and said trunnions.

10. A device as set forth in claim 4, which further comprises three potentiometers, each being constructed and arranged to measure and transmit signals of relative movement between said supporting member and said outer gimbal means, about one of said three axes.

11. A device as set forth in claim 4, in which said outer gimbal means comprises a pair of end plates journalled on said inner gimbal ring, and in which said gyroscopic element is a spinning, hollow mass of a gyroscope, fixed between said end plates, said device further comprising means for driving said gyroscopic mass, housed within said mass.

12. A stabilized inertial guidance device, adapted for use in the guidance of vehicles, comprising: an outer, instrument-supporting ring having an internal cylindrical surface, whose curvature is centered on an axis; stabilizing gyroscopes and accelerometers mounted on said outer ring; an inner, gimbal ring having on its exterior, and within said internal cylindrical surface, a cylindrical surface, centered on said axis, of a smaller diameter than said internal surface; a gimbal element within said inner gimbal ring comprising two rigidly connected pairs of oppositely arranged trunnions, the aligned trunnions of each pair being perpendicularly arranged relative to said axis and to the aligned trunnions of the other pair; a support having a middle portion comprising a yoke within said inner gimbal ring and end portions that are outside said gimbal ring and are adapted to be rigidly connected to a vehicle; bearings journalling one of said pairs of trunnions within said yoke; and bearings journalling the other of said pairs of trunnions within said gimbal ring.

References Cited in the file of this patent

UNITED STATES PATENTS

| | | |
|---|---|---|
| 2,752,792 | Draper | July 3, 1956 |
| 2,811,785 | Braddon | Nov. 5, 1957 |